United States Patent [19]

Hertweck et al.

[11] Patent Number: 5,088,462
[45] Date of Patent: Feb. 18, 1992

[54] METHOD OF ACTUATING A BUTTERFLY VALVE ARRANGED IN THE INTAKE SYSTEM OF AN AIR-COMPRESSING FUEL-INJECTED INTERNAL COMBUSTION ENGINE

[75] Inventors: Gernot Hertweck, Fellbach; Franz Bender, Wendlingen, both of Fed. Rep. of Germany

[73] Assignee: Mercedes-Benz AG, Fed. Rep. of Germany

[21] Appl. No.: 588,711

[22] Filed: Sep. 27, 1990

[30] Foreign Application Priority Data

Sep. 28, 1989 [DE] Fed. Rep. of Germany ....... 3932420

[51] Int. Cl.$^5$ .............................................. F02D 9/02
[52] U.S. Cl. ................................... 123/399; 123/361
[58] Field of Search ............... 123/340, 360, 361, 391, 123/399

[56] References Cited

U.S. PATENT DOCUMENTS

| Re. 33,027 | 8/1989 | Danno et al. | 123/361 |
|---|---|---|---|
| 4,473,052 | 9/1984 | Kamiyama et al. | 123/399 |
| 4,524,745 | 6/1985 | Tominari et al. | 123/399 |
| 4,811,713 | 3/1989 | Shimada et al. | 123/399 |
| 4,944,267 | 7/1990 | Mann | 123/360 |
| 5,002,028 | 3/1991 | Arai et al. | 123/399 |

FOREIGN PATENT DOCUMENTS

| 0110226 | 6/1984 | European Pat. Off. | 123/399 |
|---|---|---|---|
| 3128783 | 5/1982 | Fed. Rep. of Germany . | |
| 3446883 | 12/1984 | Fed. Rep. of Germany . | |
| 3500808 | 1/1985 | Fed. Rep. of Germany . | |
| 0007945 | 1/1987 | Japan | 123/391 |

*Primary Examiner*—Tony M. Argenbright
*Attorney, Agent, or Firm*—Evenson, Wands, Edwards, Lenahan & McKeown

[57] ABSTRACT

A method of actuating a throttling element in the intake system of an air-compressing fuel-injected internal combustion engine, which in low load and speed ranges is held in the closing position and in central and high load and speed ranges is held in an opening position. The throttling element in each operating point of the internal combustion engine is adjusted to that opening position which corresponds to an absolute pressure, determined from a load-dependent and speed-dependent characteristic diagram, in the intake system downstream of the throttling element, the setpoint value for the absolute pressure being corrected as a function of further operating parameters of the internal combustion engine.

6 Claims, 2 Drawing Sheets

METHOD OF ACTUATING A BUTTERFLY VALVE ARRANGED IN THE INTAKE SYSTEM OF AN AIR-COMPRESSING FUEL-INJECTED INTERNAL COMBUSTION ENGINE

BACKGROUND AND SUMMARY OF THE INVENTION

The present invention relates to a method of actuating a throttling element arranged in the intake system of an aircompressing fuel-injected internal combustion engine.

German Patent document DE-PS 3,128,783, discloses a method of this generic type for controlling exhaust gas recirculation for the purpose of reducing the emission of pollutants, in particular the emission of particulates. In addition, a reduction of the emission of nitrogen oxides ($NO_x$) can also be achieved by exhaust gas recirculation. The actuation of a butterfly valve arranged in the intake line is there effected stepwise in coordination with an exhaust gas recirculation valve arranged in an exhaust gas recirculation line.

The object of the present invention is to provide a method of actuating a throttling element of this type which achieves a reduction in the emission of pollutants, in particular the emission of particulates and nitrogen oxides, without the use of an expensive device for exhaust gas recirculation.

Improved combustion, and thus reduced emission of pollutants, is in general obtained right into the partial load range by a reduction in the mass flow of intake air by throttling the intake air flow, due to reduced cooling of the combustion chamber. Therefore, the object of the present invention is achieved by a precise matching of the throttling of the intake air to the operating point of the internal combustion engine which, on the one hand selectively reduces the reactants nitrogen and oxygen and, on the other hand selectively increases the ignition delay. This leads to a relatively late release of heat in the combustion chamber under load, thereby reducing the formation of particulates and nitrogen oxides. At the same time, it has only an insignificant effect on the emission of hydrocarbons. In addition, this progression of heating leads to an increased oxidation of the particulates forming at the beginning of the combustion process and hence also to a reduction in the emission of particulates.

In relation to a particular load and speed point, correction of the setpoint value for the absolute pressure in the intake system guarantees uniform, or only partially reduced, differential pressure between the intake system and the atmosphere. The throttling effect is thus made independent of the altitude at which the internal combustion engine is operated, while at the same time, premature emission of blue smoke from the internal combustion engine, is prevented by a complete opening of the butterfly valve below a predetermined limiting value for the atmospheric pressure, i.e., from a certain altitude.

The tendency of engines in this type to emit blue smoke is diminished by a reduction of throttling (increase of the setpoint value for the absolute pressure) in response to lower outside temperatures, and a thermal overloading of the internal combustion engine is at the same time prevented by a reduction of throttling in the direction of higher outside temperatures. Similarly, in the cold-running phase of the internal combustion engine the susceptibility to the emission of blue smoke is reduced and likewise that the internal combustion engine is protected from thermal overloading by the method according to the invention.

Other objects advantages and novel features of the present invention will become apparent from the following detailed description of the invention when considered in conjunction with the accompanying drawings.

DETAILED DESCRIPTION OF THE DRAWINGS

Figure 1:
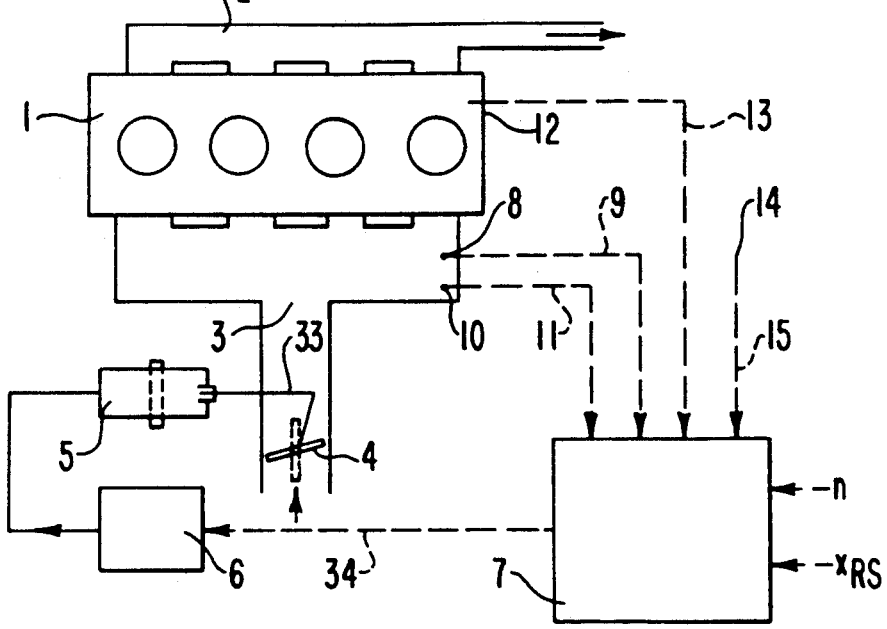
FIG. 1 shows an illustrative embodiment of a device for carrying out the method according to the invention, in a schematic representation.

In FIG. 1, reference numeral 1 indicates an air-compressing fuel-injected internal combustion engine having an exhaust system 2 and an intake system 3. Arranged in the intake system 3 is a throttling element designed as a butterfly valve 4, which can be actuated via the linkage 33 of a pneumatic actuator 5 and an electropneumatic pressure transducer 6 acting on this actuator 5. The pressure transducer is controlled by an electronic control unit 7, to which are fed, via the sensor 8 and the measured value line 9, a signal corresponding to the absolute pressure $P_{abs,actual}$ in the intake system 3 downstream of the butterfly valve 4, via the sensor 10 and the measured-value line 11 a signal corresponding to the intake air temperature $T_L$ at this point, via the sensor 12 and the measured-value line 13 a signal corresponding to the temperature $T_{KM}$ of the coolant of the internal combustion engine 1 and, via the sensor 14 and the measured-value line 15, a signal corresponding to the atmospheric pressure $P_{Atm}$. The actuation of the butterfly valve 4 via the electropneumatic pressure transducer 6 and the actuator 5 has the advantage that, when the control signal emitted by the electronic control unit 7 via the control line 34 changes, a very rapid adjustment of the butterfly valve 4 is guaranteed. Furthermore, the butterfly valve 4 can be controlled very precisely, with the result that even a slight change of the control signal causes a response of the butterfly valve 4.

Figure 2:
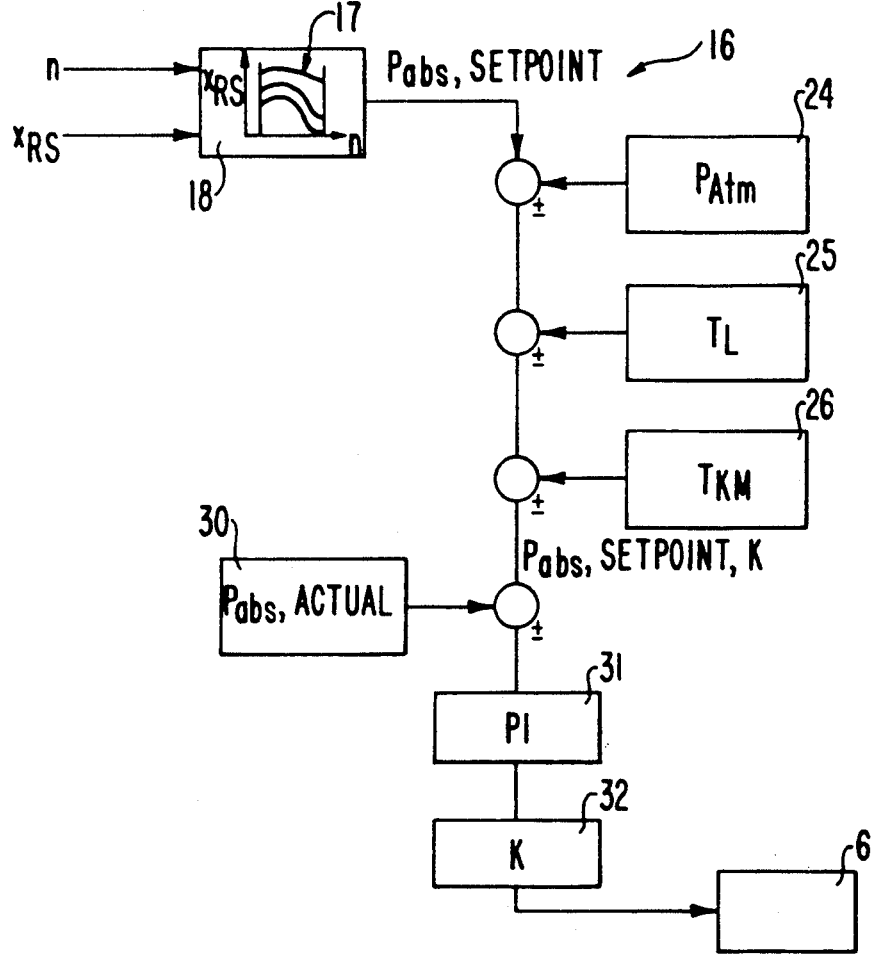
FIG. 2 is a block diagram which illustrates the actuation of the butterfly valve in accordance with the invention.
Figure 3:
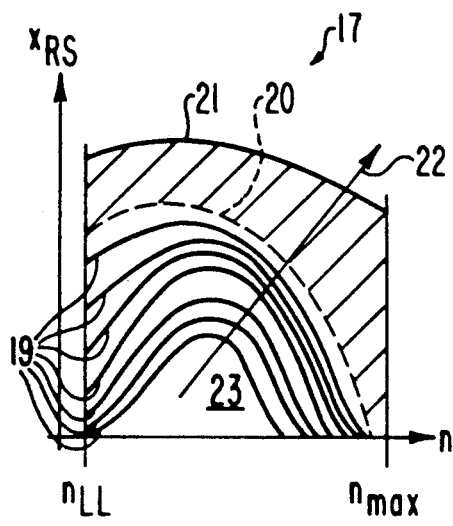
FIG. 3 shows a characteristic diagram for an internal combustion engine where $n = f(x_{RS})$.

The butterfly valve 4 is controlled in accordance with the block diagram 16 shown in FIG. 2. First of all, in block 18, a setpoint value for the absolute pressure $P_{abs, setpoint}$ is determined from an engine characteristic diagram 17 (see also FIG. 3) in accordance with the actual internal combustion engine load $X_{RS}$ ($X_{RS}$ is a measure of the deflection of the control rod at the injection pump of the internal combustion engine 1 and thus a measure of the load) and speed n. In the characteristic diagram 17 in FIG. 3, reference numeral 19 denotes the characteristics for the throttling range, the absolute pressure $P_{abs, setpoint}$ being constant along each of these lines 19. From the dashed line 20 as far as the full-load characteristic 21 (hatched region), throttling of the intake air no longer takes place. In the direction of the arrow 22, the absolute pressure $P_{abs,\,setpoint}$ increases. The range of maximum throttling thus lies in the region 23. The characteristic diagram 17 is designed for an ambient or atmospheric pressure $P_{Atm}$ of 760 torr (sea level).

Figure 4A:
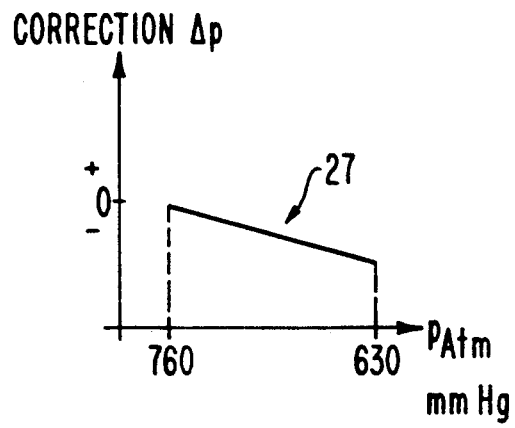
FIGS. 4a–c show 3 diagrams in accordance with which the setpoint value for the absolute pressure ($P_{abs, setpoint}$) is corrected.

After the determination of the setpoint value for the absolute pressure $P_{abs,\,setpoint}$ an additive correction is performed via the blocks 24 - 26 (FIG. 2); specifically: via block 24 as a function of the atmospheric pressure $P_{Atm}$ detected via the sensor 14, via block 25 as a function of the intake air temperature $T_L$ detected via the sensor 10, and via block 26 as a function of the temperature $T_{KM}$ of the coolant for the internal combustion engine 1 detected via the sensor 12. The correction as a function of the atmospheric pressure $P_{Atm}$ is here carried out in accordance with the graph 27 in FIG. 4a, such that the setpoint value for the absolute pressure $P_{abs,\,setpoint}$ is reduced linearly as the atmospheric pressure $P_{atm}$ falls, starting from 760 torr, the amount of the correction value $\Delta p$ increasing. If, for example, while driving up a slope, a setpoint value for the absolute pressure $P_{abs,\,setpoint}$ of 700 torr is read out from the characteristic diagram 17 in the actual operating condition of the internal combustion engine (load, speed), this setpoint value is initially valid only for atmospheric pressure at sea level. Since, however, atmospheric pressure $P_{Atm}$ decreases continuously with increasing altitude, then from that altitude at which the 700 torr absolute pressure in the intake system 3 is reached due to the gain in altitude, the butterfly valve 4 is completely opened although, with regard to the emission of pollutants, a certain throttling of the intake air would still be possible. Account is taken of this fact according to the invention by additionally subtracting from the setpoint value read out of 700 torr corresponding to the actual atmospheric pressure $P_{atm}$, a predetermined correction value $\Delta p$ (addition of a negative $\Delta p$), with the result that the absolute pressure in the intake system 3 is adjusted to a lower value by a corresponding adjustment of the butterfly valve (4). Finally, below a predetermined limiting value of 630 torr, the butterfly valve 4 is moved into its position freeing the entire cross-section of the intake system 3 (dashed representation of the butterfly valve 4).

Figure 4B:
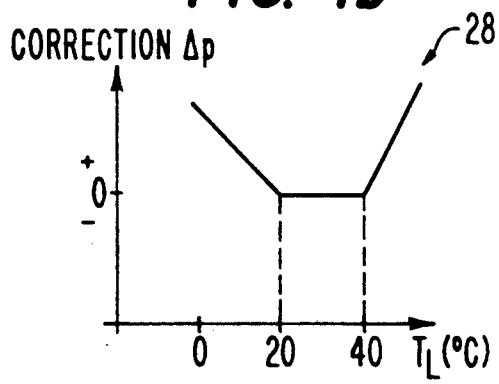

According to graph 28 of FIG. 4b, up to a first intake air temperature value of 20° C. the correction $\Delta p$ of the setpoint value for the absolute pressure $P_{abs,\,setpoint}$ is continuously reduced as the intake air temperature $T_L$ rises; in the central intake air temperature range of 20° C. up to a second intake air temperature value of 40° is held constant; and from the second intake air temperature value of 40° C. is again continuously increased as the intake air temperature $T_L$ rises.

Figure 4C:
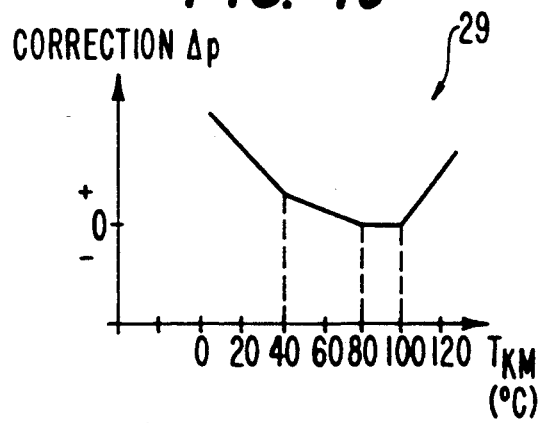

Finally, the graph 29 in FIG. 4c shows the correction $\Delta p$ of the setpoint value for the absolute pressure $P_{abs,\,setpoint}$ read out from the characteristic diagram 17 as a function of the coolant temperature $T_{KM}$. Up to a first coolant temperature value of 80°, the correction $\Delta p$ of the setpoint value is continuously reduced as the coolant temperature $T_{KM}$ rises; from this first coolant temperature value up to a second coolant temperature value of 100° C. is held constant; and from this second value is again continuously increased as the coolant temperature $T_{KM}$ rises.

The absolute pressure $P_{abs,\,actual}$ in the intake system 3, which is detected via the sensor 8 (block 30), is now readjusted to this corrected setpoint value $P_{abs,\,setpoint,\,k}$ with the aid of a PI controller (block 31). This is accomplished by a corresponding activation of the butterfly valve 4 or the electropneumatic pressure transducer 6 actuating the latter via the pneumatic actuator 5. The controller output signal is here amplified to an actuating signal for the electropneumatic pressure transducer 6 with the aid of an output stage (block 32).

An increase in the throttling of the intake air flow, i.e., a reduction of the flow cross-section in the intake system 3, produces a reduction of the absolute pressure $P_{abs,\,actual}$ in the intake system 3 downstream of the butterfly valve 4. As regards the control or regulation of the position of the butterfly valve, it can thus be stated in general terms that—based on a fixed operating point of the internal combustion engine 1—a corrective increase of the setpoint value for the absolute pressure $P_{abs,\,setpoint}$ is equivalent to a reduction of the intake air throttling, i.e., an enlargement of the flow cross-section in the intake system, 3, and vice versa.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of actuating a throttling element arranged in an intake system of an air-compressing fuel-injected internal combustion engine, said throttling element being of the type which is held in a closing position in low load and speed ranges and held in an opening position in central and high load and speed ranges, a particular opening position of the throttling element being controlled in response to a desired setpoint value for absolute pressure in said air intake system downstream of said throttling element in the direction of airflow, said set point value being determined from an engine load and engine speed-dependent characteristic diagram, said method comprising the steps of:

determining the engine load and speed at which said engine is operating
   determining from said characteristic diagram a setpoint value corresponding to said engine load and speed;
   correcting said setpoint value in response to atmospheric pressure, the amount of said correction increasing linearly with decreasing atmospheric pressure;
   adjusting the position of said throttling element to an opening position which corresponds to the corrected setpoint value; and
   moving said throttling element to a position freeing an entire cross section of said air intake system in response to atmospheric pressure falling below a predetermined limit.

2. Method according to claim 1, wherein said step of correcting said setpoint value for atmospheric pressure is effected additively.

3. Method according to claim 1, wherein in said correcting step the setpoint value for atmospheric pressure is effected as a function at least one of: intake air temperature and coolant temperature.

4. Method according to claim 3, wherein in said correcting step, in a low intake air temperature range up to a first intake air temperature value the correction of the setpoint value is reduced as the intake air temperature rises, from said first intake air temperature value up to a second intake air temperature value the correction is held constant and, above said second intake air temperature value the correction is again increased as the intake air temperature rises, the second intake air temperature value being greater than the first.

5. Method according to claim 3, wherein in said correcting step the correction of the setpoint value for the absolute pressure is reduced as the coolant temperature rises up to a first coolant temperature, is held constant from said first coolant temperature value up to a second coolant temperature value, and is again increased as the coolant temperature rises from said second coolant temperature value, said second coolant temperature value being greater than the first.

6. Method of actuating an air intake throttling element for an internal combustion engine comprising the steps of:

determining an operating pressure setpoint for said engine based on predetermined load-dependent and speed-dependent engine characteristics wherein a particular opening position of said throttle element is provided for each operating point of said engine;

causing said throttling element to be adjusted to an opening position which corresponds to said setpoint value;

measuring ambient atmospheric pressure;

determining an additive correction of said setpoint value as a function of said ambient atmospheric pressure, the magnitude of said correction increasing linearly with decreasing atmospheric pressure, whereby below a predetermined limiting value for said atmospheric pressure, the throttling element is moved into a full open position; and causing the position of said throttling element to be further adjusted by an amount corresponding to said correction.

* * * * *